D. SULLIVAN.
Apparatus for Treating Horses.
No. 139,207.  Patented May 20, 1873.
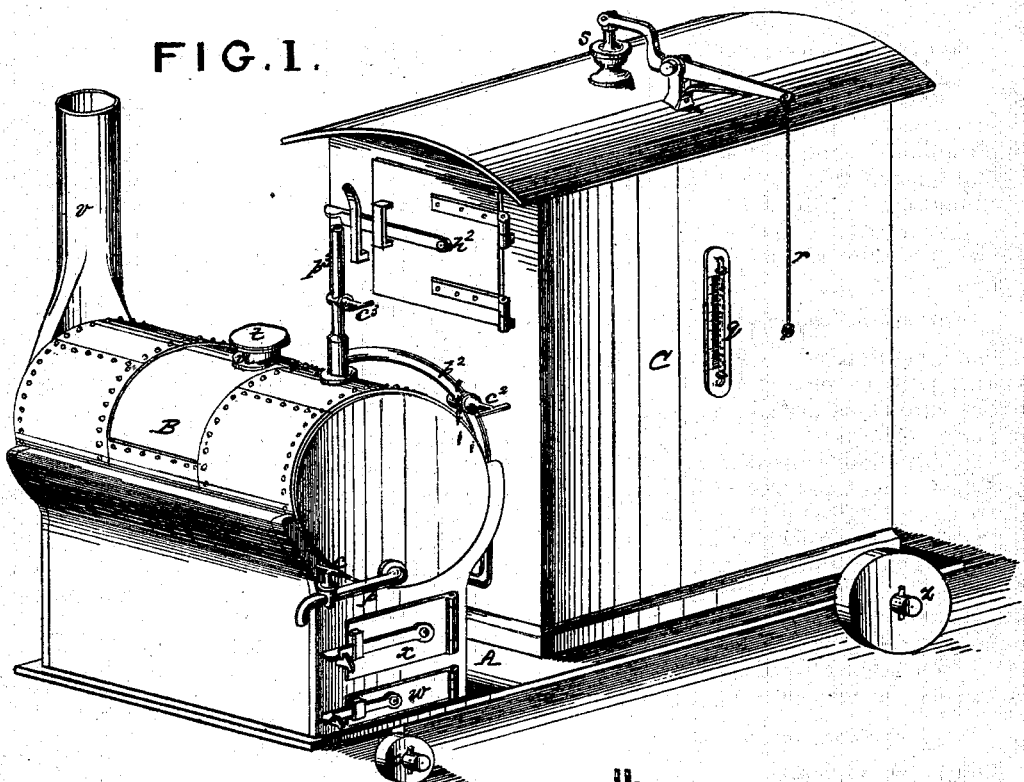
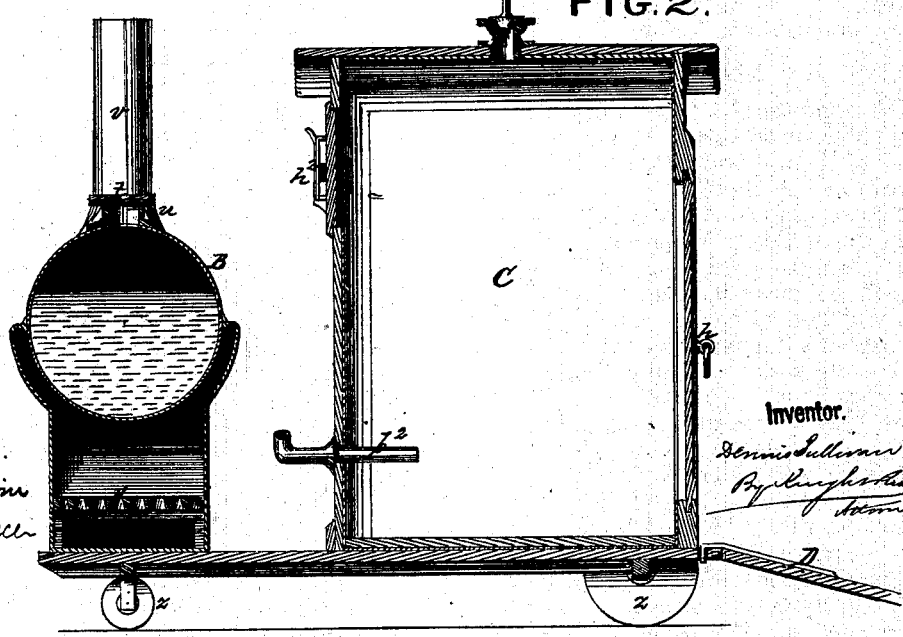

UNITED STATES PATENT OFFICE.

DENNIS SULLIVAN, OF WASHINGTON, DISTRICT OF COLUMBIA.

IMPROVEMENT IN APPARATUS FOR TREATING HORSES.

Specification forming part of Letters Patent No. 139,207, dated May 20, 1873; application filed November 4, 1872.

*To all whom it may concern:*

Be it known that I, DENNIS SULLIVAN, of Washington, in the District of Columbia, have invented an Apparatus for Treating Horses, of which the following is a specification.

Nature and Objects of the Invention.

This invention relates to means for administering pure or medicated steam to horses, for the cure of catarrhal, epidemic, and other diseases. The invention consists in a steam-bath of peculiar construction, comprising a tight box or stall to receive the animal during its treatment. Means are provided for allowing the head to project and for supplying air to the steam chamber when the horse's head is inclosed, or to assist in regulating the atmosphere of the chamber, and for determining and regulating the heat within the chamber. The apparatus is preferably mounted on wheels, but may be stationary.

Description of the Drawing.

Figure 1 is a perspective view of the apparatus, in illustrative form. Fig. 2 is a vertical longitudinal section of the same.

General Description.

A represents a low horizontal platform, mounted on wheels, $z$, to support the remainder of the apparatus and to render the same portable. B represents a small steam-boiler of any approved construction adapted to supply the requisite quantity of steam, at from fifteen to twenty-five pounds' pressure. C represents a close box or stall, adapted to accommodate a horse in standing position. D represents a temporary bridge or incline, by which to walk the animal into the slightly elevated box. The boiler A is constructed and furnished with a grate, $y$, fire-door $x$, ash-pit door $w$, smoke-stack or pipe $v$, liquid supply-neck $u$, with cap $t$, a pipe, $p$, for drawing off the liquid to empty the boiler, a steam-pipe, $p^2$, with a blow-off branch, $p^3$, and cocks $c\ c^2\ c^3$, in the respective pipes. The steam-pipe $p^2$ extends into the horse-box or stall C, and, preferably, so as to discharge beneath the chest of the animal or between its fore legs. The box C is further constructed and furnished with a door, $h$, (either sliding or hinged,) through which to introduce the animal, and a corresponding window or small door, $h^2$, for releasing or confining the head; also, with a "ventilator," $s$, of any suitable construction, to permit the escape of steam and to admit more or less air, as may be necessary. This may be operated by means of a cord, $r$. The box is also furnished with a thermometer, $q$, by which to determine the degree of heat within the chamber. The arrangement of the parts is obviously variable, as also unessential details of construction. The box, in the illustration, is constructed of wood, lined with sheet metal.

The apparatus may be adapted to treat two or more horses at one and the same time, by a mere multiplication, or multiplication and enlargement, of parts. The apparatus may be either portable or stationary.

Operation.

The boiler B being cleansed, and the cocks $c\ c^2\ c^3$ closed, it is charged with a supply of water and any medicinal agent which it may be desirable to use, and the cap $t$ is applied. The boiler is next heated, so as to generate steam, and a steam pressure of from fifteen to twenty-five pounds is maintained.

To treat a horse, it is admitted into the box or stall C, fastened in by means of the door $h$. If the animal is not strong enough to inhale the steam atmosphere which is deemed necessary for treating the body, the head may be released by opening the door or window $h^2$, and the space about the neck may be closed by means of a blanket. If the head is confined air is admitted by opening the ventilator $s$. Steam is now admitted, by opening the cock $c^2$, until the proper temperature is gradually attained, and then to maintain the proper degree of heat. This may be determined by reference to the thermometer $q$, and the heat may be promptly and readily regulated by means of the cock $c^2$, and by opening the ventilator $s$, more or less, by means of the cord $r$. The degree of heat which the animal can bear, and the peculiar character of the steam, and the length of the operation, will be determined by the strength of the animal and the nature of its affection.

It is known that vapor and steam have heretofore been administered to horses, both internally and externally, for the cure of various disorders; but not by apparatus similar to that described above; and, as is believed, with very inferior results to those which can be attained by means of this invention.

*Claim.*

The following is claimed as new, namely:

An apparatus for treating horses with pure or medicated steam, having a close box or stall, C, and constructed and operating substantially as herein set forth, for the purpose specified.

Witnesses:       DENNIS SULLIVAN.
  JAS. L. EWIN,
  OCTAVIUS KNIGHT.